(12) United States Patent
Cha et al.

(10) Patent No.: US 11,450,481 B2
(45) Date of Patent: *Sep. 20, 2022

(54) MULTILAYER ELECTRONIC COMPONENT

(71) Applicant: SAMSUNG ELECTRO-MECHANICS CO., LTD., Suwon-si (KR)

(72) Inventors: Kyoung Jin Cha, Suwon-si (KR); Woo Chul Shin, Suwon-si (KR); Seung Heui Lee, Suwon-si (KR); Beom Seock Oh, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,331

(22) Filed: Feb. 22, 2021

(65) Prior Publication Data

US 2021/0175012 A1    Jun. 10, 2021

Related U.S. Application Data

(63) Continuation of application No. 16/786,159, filed on Feb. 10, 2020, now Pat. No. 11,037,727.

(30) Foreign Application Priority Data

Jul. 29, 2019    (KR) .......................... 10-2019-0091562

(51) Int. Cl.
```
H01G 4/005    (2006.01)
H01G 4/08     (2006.01)
H01G 4/30     (2006.01)
```
(52) U.S. Cl.
CPC .............. *H01G 4/005* (2013.01); *H01G 4/08* (2013.01); *H01G 4/30* (2013.01)

(58) Field of Classification Search
CPC ............. H01G 4/005; H01G 4/08; H01G 4/30
See application file for complete search history.

(56) References Cited

U.S. PATENT DOCUMENTS

| | | | |
|---|---|---|---|
| 8,233,264 B2 | 7/2012 | Cho et al. | |
| 8,456,799 B2 | 6/2013 | Chang et al. | |

(Continued)

FOREIGN PATENT DOCUMENTS

| | | | |
|---|---|---|---|
| CN | 105280377 A | 1/2016 | |
| CN | 105849836 A | 8/2016 | |

(Continued)

OTHER PUBLICATIONS

Notice of Office Action issued in corresponding Japanese Patent Application No. 2020-020743 dated Apr. 13, 2021, with English translation.

(Continued)

*Primary Examiner* — Dion R. Ferguson

(74) *Attorney, Agent, or Firm* — Morgan, Lewis & Bockius LLP

(57) ABSTRACT

A multilayer electronic component includes a body including dielectric layers and internal electrodes alternately disposed in a first direction, and external electrodes disposed on the body to be connected to the internal electrodes. At least one internal electrode of the internal electrodes includes a plurality of disconnected portions penetrating through a respective internal electrode. A disconnected portion of the plurality of disconnected portions includes at least one of a pore or a dielectric substance disposed to connect adjacent dielectric layers to each other. A dielectric filling ratio, defined as a ratio of an overall length of the dielectric substance to an overall length of the disconnected portion on a cross section in the third and first directions, is more than 20% to 80% or less.

17 Claims, 5 Drawing Sheets

(56) References Cited

U.S. PATENT DOCUMENTS

| | | |
|---|---|---|
| 8,971,017 B1 | 3/2015 | Nakamura |
| 9,287,043 B2 | 3/2016 | Lee et al. |
| 9,478,358 B2 | 10/2016 | Kanzaki et al. |
| 9,530,566 B2 | 12/2016 | Ishida et al. |
| 11,037,727 B2 * | 6/2021 | Cha .................... H01G 4/0085 |
| 2005/0152095 A1 | 7/2005 | Nakano et al. |
| 2006/0198078 A1 | 9/2006 | Miyauchi et al. |
| 2011/0141652 A1 | 6/2011 | Chang et al. |
| 2012/0162858 A1 | 6/2012 | Tanaka et al. |
| 2013/0094118 A1 | 4/2013 | Kim et al. |
| 2013/0286538 A1 | 10/2013 | Kim et al. |
| 2014/0254063 A1 | 9/2014 | Konishi et al. |
| 2015/0116898 A1 | 4/2015 | Takashima et al. |
| 2015/0364259 A1 | 12/2015 | Kanzaki et al. |
| 2016/0329151 A1 | 11/2016 | Ishida et al. |
| 2019/0115153 A1 | 4/2019 | Park et al. |
| 2019/0259535 A1 | 8/2019 | Kowase |
| 2019/0304687 A1 | 10/2019 | Iguchi |
| 2020/0312570 A1 | 10/2020 | Hashimoto |

FOREIGN PATENT DOCUMENTS

| | | |
|---|---|---|
| CN | 110310826 A | 10/2019 |
| JP | H10-172855 A | 6/1998 |
| JP | 2001-52950 A | 2/2001 |
| JP | 2003-77761 A | 3/2003 |
| JP | 2004-111698 A | 4/2004 |
| JP | 2004-119797 A | 4/2004 |
| JP | 2005-223313 A | 8/2005 |
| JP | 2007-335726 A | 12/2007 |
| JP | 2010-283141 A | 12/2010 |
| JP | 2015-70048 A | 4/2015 |
| JP | 2015-82636 A | 4/2015 |
| JP | 2016-15465 A | 1/2016 |
| JP | 2018-56292 A | 4/2018 |
| JP | 2019-75530 A | 5/2019 |
| JP | 2019-176131 A | 10/2019 |
| JP | 2020-167283 A | 10/2020 |
| WO | 2006/068245 A1 | 6/2006 |

OTHER PUBLICATIONS

J. R. Yoon et al., "Control of Connectivity of Ni Electrode with Heating Rates During Sintering and Electrical Properties in BaTiO3 Based Multilayer Ceramic Capacitors", Transactions on Electrical and Electronic Materials, vol. 13, No. 4, pp. 181-184, Aug. 25, 2012.

Office Action issued in corresponding Chinese Patent Application No. 202010271888.8 dated Sep. 26, 2021, with English translation.

* cited by examiner

MULTILAYER ELECTRONIC COMPONENT

CROSS-REFERENCE TO RELATED APPLICATION(S)

The present application is the continuation application of U.S. patent application Ser. No. 16/786,159 filed on Feb. 10, 2010, which claims the benefit of priority to Korean Patent Application No. 10-2019-0091562 filed on Jul. 29, 2019 in the Korean Intellectual Property Office, the entire disclosures of which are incorporated herein by reference.

TECHNICAL FIELD

The present disclosure relates to a multilayer electronic component.

BACKGROUND

A multilayer ceramic capacitor (MLCC), a type of capacitor component, is a chip-type capacitor mounted on the printed circuit boards of various electronic products such as imaging devices such as liquid crystal displays (LCDs) and plasma display panels (PDPs), computers, smartphones, and mobile phones, serving to charge or discharge electricity.

Such an MLCC may be used as a component of various electronic devices due to advantages thereof such as compactness, guaranteed high capacitance, and ease of mountability. As various electronic devices such as computers and mobile devices are small in size and high in power, there is increasing demand for miniaturization and high capacitance of multilayer ceramic capacitors.

In order to achieve miniaturization and high capacitance in a multilayer ceramic capacitor, a dielectric layer and an internal electrode should be thinned to increase the number of laminated layers. At present, a thickness of a dielectric layer has reached a level of about 0.6 μm, and the thinning continues to be performed.

As a dielectric layer and an internal electrode are thinned, the number of laminated layers may be increased but the number of boundaries between dielectric layers and the internal electrodes may also be increased. The boundary between the dielectric layer and the internal electrode is a region in which heterogeneous materials such as a metal and ceramic are bonded to each other. Due to low bonding strength between the heterogeneous materials, the boundary is vulnerable to delamination and cracking. In addition, the delamination and the cracking may cause humidity resistance reliability to be degraded.

The information included in this Background section is only for enhancement of understanding of the general background of the present disclosure and may not be taken as an acknowledgement or any form of suggestion that this information forms the prior art already known to a person skilled in the art.

SUMMARY

According to one aspect of the present disclosure, a multilayer electronic component can provide an improved reliability.

According to another aspect of the present disclosure, a multilayer electronic component can have an improved withstand voltage characteristics.

According to another aspect of the present disclosure, a multilayer electronic component can achieve miniaturization while also securing high capacitance of a multilayer electronic component.

According to one exemplary embodiment of the present disclosure, a multilayer electronic component includes a body including dielectric layers and internal electrodes alternately disposed in a first direction, and having first and second surfaces disposed to oppose each other in the first direction, third and fourth surfaces connected to the first and second surfaces and disposed to oppose each other in a second direction, and fifth and sixth surfaces connected to the first to fourth surfaces and disposed to oppose each other in a third direction, and external electrodes disposed on the body to be connected to the internal electrodes. At least one internal electrode of the internal electrodes includes a plurality of disconnected portions penetrating through a respective internal electrode. A disconnected portion of the plurality of disconnected portions includes at least one of a pore or a dielectric substance disposed to connect adjacent dielectric layers to each other. A dielectric filling ratio, defined as a ratio of an overall length of the dielectric substance to an overall length of the disconnected portion on a cross section in the third and first directions, is more than 20% to 80% or less.

According to another exemplary embodiment of the present disclosure, a multilayer electronic component includes a body including dielectric layers and internal electrodes alternately disposed in a first direction and external electrodes disposed on the body. At least one internal electrode of the internal electrodes includes a plurality of disconnected portions penetrating through a respective internal electrode. A disconnected portion of the plurality of disconnected portions includes at least one of a pore or a dielectric substance disposed to connect adjacent dielectric layers to each other. The dielectric substance includes a same material as the dielectric layers. At least one of the plurality of disconnected portions includes both the pore and the dielectric substance and has a length greater than a thickness of the at least one internal electrode on a cross section of the body taken in the first direction.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
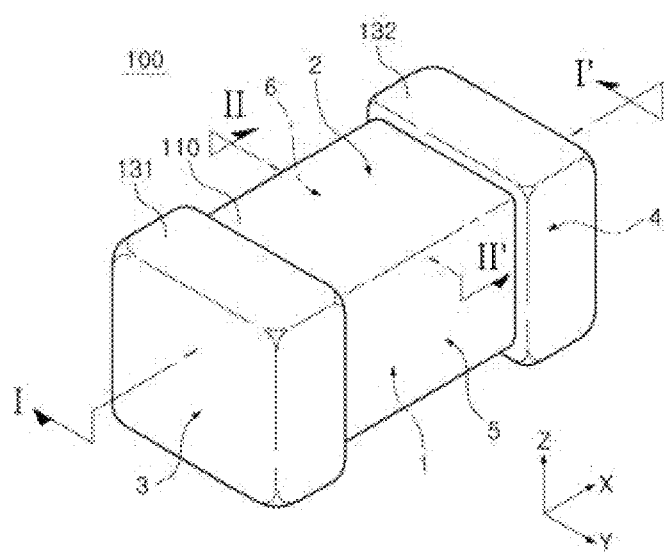
FIG. 1 is a schematic perspective view of a multilayer electronic component according to an exemplary embodiment of the present disclosure.

Hereinafter, embodiments in the present disclosure will be described as follows with reference to the attached drawings. The present disclosure may, however, be embodied in many different forms and should not be construed as being limited to the embodiments set forth herein. Rather, these embodiments are provided so that this disclosure will be thorough and complete, and will fully convey the scope of the present disclosure to those skilled in the art. In the drawings, the shapes and dimensions of elements may be exaggerated for clarity, and the same reference numerals will be used throughout to designate the same or like components.

Also, elements having the same function within a scope of the same concept illustrated in drawings of respective embodiments will be described by using the same reference numerals. Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

In drawings, an X direction may be defined as a second direction, an L direction, or a length direction, a Y direction may be defined as a third direction, a W direction, or a width direction, and a Z direction may be defined as a first direction, a stacking direction, a T direction, or a thickness direction.

Capacitor Component

FIG. 1 is a schematic perspective view of a multilayer electronic component according to an exemplary embodiment of the present disclosure.

Figure 2:
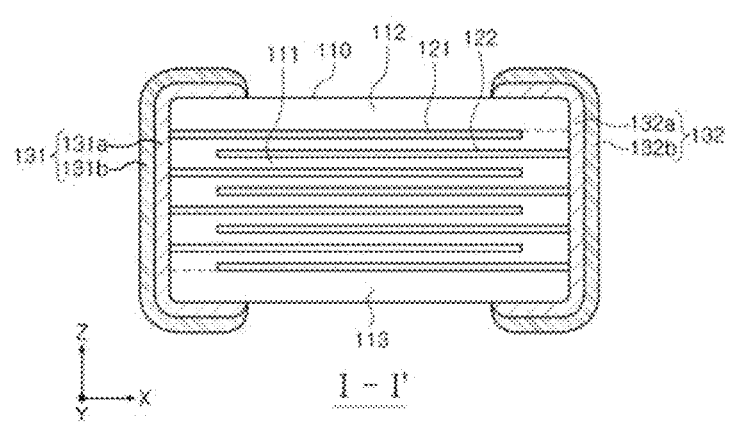
FIG. 2 is a schematic cross-sectional view taken along line I-I' in FIG. 1.

FIG. 2 is a schematic cross-sectional view taken along line I-I' in FIG. 1.

Figure 3:
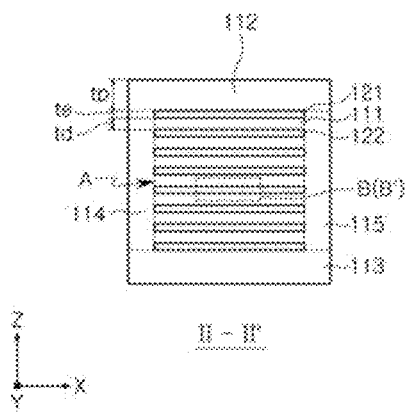
FIG. 3 is a schematic cross-sectional view taken along line II-IF in FIG. 1.

FIG. 3 is a schematic cross-sectional view taken along line II-II' in FIG. 1.

Figure 4:
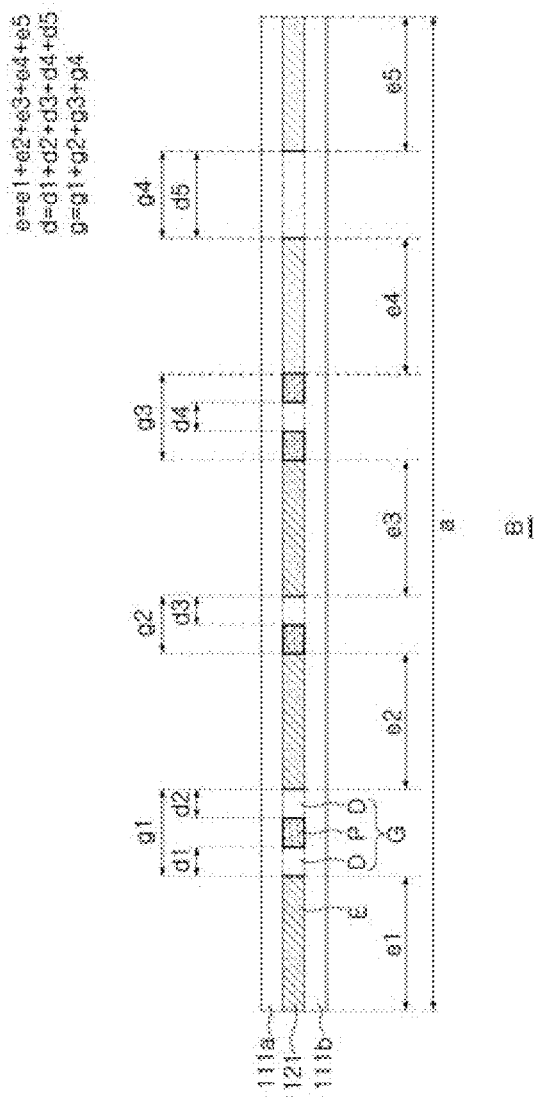
FIG. 4 is an enlarged view of region B in FIG. 3.

FIG. 4 is an enlarged view of region B in FIG. 3.

Figure 5:
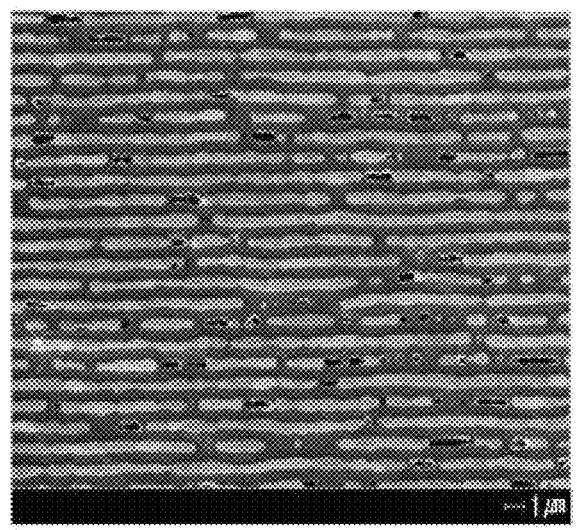
FIG. 5 is an image, scanned by a scanning electron microscope (SEM), illustrating a cross section of a multilayer electronic component according to an exemplary embodiment of the present disclosure.

FIG. 5 is an image, scanned by a scanning electron microscope (SEM), illustrating a cross section of a multilayer electronic component according to an exemplary embodiment of the present disclosure.

Referring to FIGS. 1 to 5, a multilayer electronic component according to an exemplary embodiment includes a body 110 including dielectric layers 111 and internal electrodes 121 and 122 alternately disposed in a first direction (a Z direction) and having first and second surfaces 1 and 2 disposed to oppose each other in the first direction (the Z direction), third and fourth surfaces 3 and 4 connected to the first and second surfaces 1 and 2 and disposed to oppose each other in a second direction (an X direction), and fifth and sixth surfaces 5 and 6 connected to the first to fourth surfaces 1, 2, 3, and 4 and disposed to oppose each other in a third direction (a Y direction), and external electrodes 131 and 132 disposed on external surfaces of the body 110 to be connected to the internal electrodes 121 and 122. The internal electrode includes a plurality of disconnected portions G penetrating through the internal electrode. The disconnected portion G includes a pore P and at least one of the dielectric substances D disposed to connect adjacent dielectric layers 111a and 111b to each other. A dielectric filling ratio, defined as a ratio of an overall length of the dielectric substance D to an overall length of the disconnected portion G on a cross section in the third and first directions (a cross section in the Y and Z directions), is more than 20% to 80% or less.

In the body 110, the dielectric layers 111 and the internal electrodes 121 and 122 are alternately laminated.

The body 110 is not limited in shape, but may have a hexahedral shape or a shape similar thereto. Due to shrinkage of ceramic powder particles included in the body 110 during sintering, the body 110 may have a substantially hexahedral shape rather than a hexahedral shape having complete straight lines.

The body 110 may have first and second surfaces 1 and 2 disposed to oppose each other in a thickness direction (a Z direction), third and fourth surfaces 3 and 4 connected to the first and second surfaces 1 and 2 and disposed to oppose each other in a length direction (an X direction), and fifth and sixth surfaces connected to the first and second surfaces 1 and 2 as well as to the third and fourth surfaces 3 and 4 and disposed to oppose each other in a width direction (a Y direction).

The plurality of dielectric layers 111, constituting the body 110, is in a sintered state and may be integrated with each other such that boundaries therebetween may not be readily apparent without using a scanning electron microscope (SEM).

A raw material forming the dielectric layers 111 is not limited as long as sufficient capacitance can be obtained, but may be, for example, barium titanate ($BaTiO_3$)-based powder particles. In the raw material forming the dielectric layers 111, various ceramic additives, organic solvents, plasticizers, binders, dispersing agents, and the like, may be added to powder particles such as barium titanate ($BaTiO_3$) powder particles or the like, according to the purpose of the present disclosure.

In this case, the body 110 may include a capacitance forming portion A, disposed inside the body 110, including a first internal electrode 121 and a second internal electrode 122 disposed to face each other with the dielectric layer 111 interposed therebetween, and cover portions 112 and 113 disposed above and below the capacitance forming portion A.

The capacitance forming portion A may be a portion contributing to forming capacitance of a capacitor and may be formed by repeatedly laminating a plurality of first and second internal electrodes 121 and 122 with respective dielectric layers 111.

The upper cover portion 112 and the lower cover portion 113 may be formed by laminating a single dielectric layer or two or more dielectric layers on the upper and lower surfaces of the capacitance forming portion A in a thickness direction, respectively. The upper cover portion 112 and the lower cover portion 113 may basically serve to prevent damage to an internal electrode caused by physical or chemical stress.

The upper cover part 112 and the lower cover part 113 may not include an internal electrode, and may include the same material as the dielectric layer 111.

For example, the upper cover portion 112 and the lower cover portion 113 may include a ceramic material such as a barium titanate ($BaTiO_3$)-based ceramic material.

In addition, margin portions 114 and 115 may be disposed on side surfaces of the capacitance forming portion A.

The margin portions 114 and 115 include a margin portion 114, disposed on the sixth surface 6 of the body 110, and a margin portion 115 disposed on the fifth surface 5. For example, the margin parts 114 and 115 may be disposed on both side surfaces of the ceramic body 110 in the width direction.

The margin portion 114 and 115 may refer to regions between boundaries between both ends of the first and second internal electrodes 121 and 122 and the body 110 in a cross-section of the body 110 taken in a width-thickness (W-T) direction, as illustrated in FIG. 3.

The margins 114 and 115 may basically serve to prevent damage to the internal electrode caused by physical or chemical stress.

The margins 114 and 115 may be formed by applying a conductive paste, except for a region in which the margin portion is to be formed, to form an internal electrode on the ceramic green sheet.

In order to prevent a step from being formed by the internal electrodes 121 and 122, after the internal electrodes 121 and 122 may be laminated and then cut to be exposed to the fifth and sixth surfaces 5 and 6 of the body 110, a single dielectric layer or two or more dielectric layers may be laminated on both side surfaces of the capacitance forming portion A in the width direction to form the margin portions 114 and 115.

The internal electrodes 121 and 122 are alternately laminated with the dielectric layer 111.

The internal electrodes 121 and 122 may include first and second internal electrodes 121 and 122. The first and second internal electrodes 121 and 122 are alternately disposed to face each other with dielectric layers 111, constituting the body 110, interposed therebetween and may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4.

In this case, the first and second internal electrodes 121 and 122 may be electrically separated from each other by the dielectric layer 111 disposed therebetween.

The body 110 may be formed by alternately laminating a ceramic green sheet, on which the first internal electrode 121 is printed, and a ceramic green sheet, on which the second internal electrode 122 is printed, and firing the laminated ceramic green sheets. A material of the internal electrodes 121 and 122 is not limited, and may be a material having improved electrical conductivity.

For example, the body 110 may be formed by printing a conductive paste for an internal electrode, including at least one of palladium (Pd), nickel (Ni), copper (Cu), and alloys thereof, on a ceramic green sheet.

In addition, an appropriate amount of at least one of silicon (Si), magnesium (Mg), and aluminum (Al) may be included in the conductive paste for internal electrodes to control the dielectric filling ratio.

A method of printing the conductive paste for an internal electrode may be a screen-printing method, a gravure printing method, or the like, but is not limited thereto.

Since the conductive paste for an internal electrode and the ceramic green sheet are different in shrinkage initiation temperatures, agglomeration or disconnection of an internal electrode may occur after sintering. Therefore, when observing a cross section of a body taken in a stacking direction after sintering, a disconnected portion of the internal electrode may be observed.

In general, a disconnected portion of an internal electrode is formed as a pore. When the disconnected portion is formed as a pore, bonding force is not generated. Accordingly, the pore of the disconnected portion may reduce the bonding force between the dielectric layer and the internal electrodes to reduce strength of a multilayer electronic component and to increase probability of occurrence of delamination and cracking to degrade humidity resistance reliability.

However, in the present disclosure, a portion of the disconnected portion G may include a dielectric substance D, disposed to connect adjacent dielectric layers (111a, 111b), to improve the bonding force. Thus, strength of the multilayer electronic component may be improved and delamination and cracking may be suppressed to improve humidity resistance reliability.

According to the present disclosure, the internal electrodes 121 and 122 include a plurality of disconnected portions G, penetrating the internal electrodes, and the disconnected portion G may include at least one dielectric material D among dielectric materials disposed to connect adjacent dielectric layers 111a and 111b to each other.

FIG. 4 is a schematic enlarged view of the internal electrode 121. Hereinafter, an internal electrode according to the present disclosure will be described in detail with reference to FIG. 4 with focus on the first internal electrode 121, but the description thereof may be identically applied to the second internal electrode 122.

The internal electrode 121 includes a plurality of disconnected portions G penetrating through the internal electrode 121. The disconnected portion G may include a pore P and at least one of the dielectric substances D disposed to connect the adjacent dielectric layers 111a and 111b to each other. For example, the disconnected portion G may be entirely filled with a dielectric substance D, or may include a pore P without a dielectric substance D (FIG. 6) and may include both the pore P and the dielectric substance D. In addition, one disconnected portion G may include two or more pores P or two or more dielectric substances D.

The dielectric substance D may be disposed in the form of connecting the adjacent dielectric layers 111a and 111b. For example, the dielectric substance D is disposed in the form of connecting the dielectric layer 111a, disposed above the disconnected portion G and the dielectric layer 111b, disposed below the disconnected portion G, to improve the bonding force between the upper and lower dielectric layers 111a and 111b. As a result, strength of a multilayer electronic component can be improved and delamination and cracking may be suppressed to improve humidity resistance reliability.

The dielectric substance D may include the same material as the dielectric layer 111. For example, the dielectric substance D and the dielectric layer 111 may include barium titanate ($BaTiO_3$), and may include barium titanate ($BaTiO_3$) as a main component.

The dielectric (D) may include at least one of silicon (Si), magnesium (Mg), and aluminum (Al).

At least one of the plurality of disconnected portions G includes both a pore P and a dielectric substance D, disposed to connect the adjacent dielectric layers, to further improve the bonding force between adjacent dielectric layers.

At least one of the plurality of disconnected portions G may have a length greater than a thickness of the internal electrode on a cross section in the first direction to further improve the bonding force between adjacent dielectric layers.

At least one of the plurality of disconnected portions G may include a dielectric substance D disposed to connect adjacent dielectric layers to each other.

Figure 6:
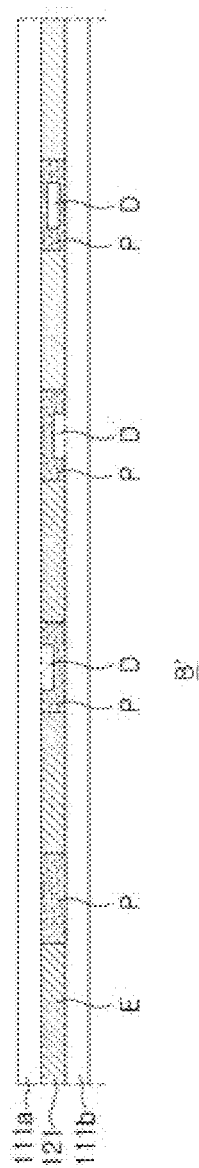
FIG. 6 is an enlarged view of region B' in FIG. 3.

Not all dielectric substances, included in the disconnected portion G, may be disposed in the form of connecting the adjacent dielectric layers 111a and 111b. A portion of the dielectric substances, included in the discontented portion G, may be disposed in the form of being not connected to any one of the upper and lower dielectric layers 111a and 111b (FIG. 6).

The pore P may be a void filled with air, and may be a portion in which bonding force is not generated.

Except for the disconnected portions G of the internal electrode, the other portions may be electrode portions E.

The electrode portion E may be formed by sintering a conductive paste for an internal electrode.

In the multilayer electronic component according to an exemplary embodiment of the present disclosure, the dielectric filling ratio may be more than 20% to less than 80%.

A dielectric filling ratio may be defined as a ratio of an overall length of a dielectric substance, disposed to connect adjacent dielectric layers, to an overall length of a disconnected portion, and may be measured by scanning an image of a cross section in the first direction (the stacking direction) with a scanning electron microscope (SEM).

The cross section in the first direction refers to a cross section of a body taken in the first direction, a stacking direction in which dielectric layers and internal electrode are laminated, and may be a cross section in second and first directions (an L-T cross section) or a cross section in third and first directions (a W-T cross section).

Specifically, an image may be obtained by scanning the cross section in the third and first directions (the W-T cross section), taken along a central portion of the body 110 in a second direction (an L direction), with a scanning electron microscope (SEM). Then, an overall length of the disconnected portion and an overall length of the dielectric substance, disposed to connect adjacent dielectric layers, in a 60 μm×40 μm region of a central portion of the W-T cross section may be measured to obtain a dielectric filling ratio.

Referring to FIG. 4, a dielectric filling ratio may be expressed as (d/g)*100 [%], a ratio of an entire surface of the dielectric substance D (d=d1+d2+d3+d4) to an overall length of the disconnected portion G (g=g1+g2+g3+g4).

A portion of the dielectric substances, included in the disconnected portion G, may be disposed in the form of being not connected to any one of the upper and lower dielectric layer 111a and 111b. However, an overall length d of the dielectric substance D (d=d1+d2+d3+d4+d5) refers to only a length of the dielectric substance D disposed in the form of connecting the adjacent dielectric layers 111a and 111b to each other.

When the dielectric filling ratio is 20% or less, an bonding force improving effect, obtained by the dielectric material D, may be insufficient. Accordingly, the dielectric filling ratio may be, in detail, more than 20%, in further detail, 25% or more. To further improve the bonding force improving effect and a chip strength improving effect, the dielectric filling ratio may be, in further detail, more than 50%.

On the other hand, since a thickness te of the dielectric layer 111 may be locally decreased when the dielectric filling ratio is 80% or more, withstand voltage characteristics may be deteriorated. According to the present disclosure, since the local decrease in the thickness te of the dielectric layer 111 may be suppressed by controlling the dielectric filling ratio to be less than 80%, the withstand voltage characteristics may be secured even when the dielectric thickness is low. Accordingly, the dielectric filling ratio may be, in detail, less than 80%, in further detail, 75% or less.

A method of controlling the dielectric filling ratio is not limited as long as the dielectric filling ratio may be controlled to be more than 20% to less than 80%.

For example, the dielectric filling ratio may be controlled using a method of applying appropriate pressure to the body in the stacking direction during sintering.

The dielectric filling ratio may be controlled by adjusting a temperature rising rate, a time, a sintering atmosphere, and the like, in a sintering process.

The dielectric filling ratio may be controlled by adjusting amounts of conductive powder particles, an organic material, ceramic added to the conductive paste for an internal electrode. In addition, the dielectric filling ratio may be controlled by mixing conductive powder particles having different sizes and adjusting a ratio thereof, or by changing printing conditions of the conductive paste.

In a multilayer electronic component according to an exemplary embodiment of the present disclosure, internal electrode connectivity may be 70% or more. This is because it may be difficult to secure sufficient capacitance when the internal electrode connectivity is less than 70%.

An upper limit of the internal electrode connectivity does not need to be limited. However, since the bonding force improving effect, depending on the dielectric filling ratio, may be insignificant when the internal electrode connectivity is more than 95%, the upper limit of the internal electrode connectivity may be 95%.

The internal electrode connectivity may be defined as a ratio of a length of an internal electrode, excluding a disconnected portion, to a length of the internal electrode and may be measured by scanning an image of a cross section in the first direction (the stacking direction) with a scanning electron microscope (SEM).

In this case, the cross section in the first direction refers to a cross section of a body taken in the first direction, a stacking direction of a dielectric layer and an internal electrode. The cross section in the first direction may be, for example, a cross section in the second and first directions (an L-T cross section) or a cross section in the third and first directions (a W-T cross section).

Specifically, an image may be obtained by scanning the cross section in the third and first directions (the W-T cross section), taken along a central portion of the body 110 in a second direction (an L direction), with a scanning electron microscope (SEM). Then, a length of an internal electrode and a length of an internal electrode, excluding a disconnected portion, in a 60 μm×40 μm region of a central portion of the W-T cross section may be measured to obtain internal electrode connectivity.

Referring to FIG. 4, a length of an internal electrode, excluding a disconnected portion, refers to an actual length of the internal electrode and may refer to a length of an electrode portion E formed by sintering an internal electrode paste. For example, a length "a" of the internal electrode may be the sum of a length of the electrode portion E (e=e1+e2+e3+e4+e5) and a length of the disconnected portion (g=g1+g2+g3+g4).

Therefore, the internal electrode connectivity is expressed as (e/a)*100 [%], a ratio of the actual length of the internal electrode (e=e1+e2+e3+e4+e5) to the length "a" of the internal electrode.

A method of controlling the internal electrode connectivity is not limited. For example, in the conductive paste for an internal electrode, a size of a metal particle, the amount of an added organic material, and the amount of ceramic may be adjusted to control the internal electrode connectivity. Alternatively, a temperature rising rate, a sintering atmosphere, and the like, may be adjusted in a sintering process to control the internal electrode connectivity.

In order to achieve miniaturization and high capacitance of a multilayer ceramic capacitor, a dielectric layer and an internal electrode should be thinned to increase the number of laminated layers. As a dielectric layer and an internal electrode are thinned, the number of laminated layers may be increased but the number of boundaries between dielectric layers and the internal electrodes may also be increased. The boundary between the dielectric layer and the internal electrode is a region in which heterogeneous materials such as a metal and ceramic are bonded to each other. Due to low bonding strength between the heterogeneous materials, the boundary is vulnerable to delamination and cracking. Therefore, as the dielectric layer and the internal electrode are thinned, a portion of the cutout portion G may be filled with the dielectric substance D to improve withstand voltage characteristics and reliability.

In detail, when at least one of the thickness to of each of the internal electrodes 121 and 122 and the thickness td of the dielectric layer 111 is 0.41 µm or less, the withstand voltage characteristics and the reliability may be significantly improved.

The thickness of the respective first and second internal electrodes 111 and 122 may refer to an average thickness of the respective first and second internal electrodes 121 and 122.

The average thickness of the respective first and second internal electrodes 121 and 122 may be measured by scanning a cross section of the body 110 in length-thickness directions (an L-T cross section) with a scanning electron microscope (SEM).

For example, the average thickness of the dielectric layer 111 may be obtained by measuring thickness values at 30 equidistant points of the respective first and second electrodes 121 and 122 in the length direction thereof, with respect to any dielectric layer extracted from an image obtained by scanning a cross section of the body 110 in third and first directions (an L-T cross section).

The thickness values at 30 equidistant points may be measured in a capacitance forming portion in which the first and second internal electrodes 121 and 122 overlap each other.

The thickness td of the dielectric layer 111 may refer to an average thickness of the dielectric layer 111 interposed between the first and second internal electrodes 121 and 122.

Similarly to the thickness to of the internal electrode, the thickness td of the dielectric layer 111 may be measured by scanning a cross section of the body 110 in the third and first direction (an L-T cross section) with a scanning electron microscope (SEM).

For example, the average thickness of the dielectric layer 111 may be obtained by measuring thickness values at 30 equidistant points of the dielectric layer 111 in the length direction thereof, with respect to any dielectric layer extracted from an image obtained by scanning a cross section of the body 110 in the third and first directions (an L-T cross section) with a scanning electron microscope (SEM).

The thickness values at 30 equidistant points may be measured in a capacitance forming portion in which the first and second internal electrodes 121 and 122 overlap each other.

A thickness of each of the cover portions 112 and 113 does not need to be limited. However, in order to more easily achieve miniaturization and high capacitance of a multilayer electronic component, the thickness tp of each of the cover portions 112 and 113 may be 20 µm or less.

External electrodes 131 and 132 are disposed on the body 110 and connected to the internal electrodes 131 and 122.

As illustrated in FIG. 2, the multilayer electronic component 100 may include external electrodes 131 and 132, respectively disposed on third and fourth surfaces 3 and 4 of the body 110 to be respectively connected to the internal electrodes 121 and 122.

In the present disclosure, the multilayer electronic component 100 has a structure including two external electrodes 131 and 132, but the number, shape, and the like of the external electrodes 131 and 132 may vary depending on a shape of the internal electrodes 131 and 132 or other purposes of the present disclosure.

The external electrodes 131 and 132 may be formed of any material as long as it has electrical conductivity, such as a metal. A specific material may be determined in consideration of electrical characteristics, structural stability. Furthermore, the multilayer electronic component 100 may have a multilayer structure.

For example, the external electrodes 131 and 132 may include electrode layers 131a and 132a, disposed on the body 110, and plating layers 131b and 132b formed on the electrode layers 131a and 132a.

As a further detailed example of the electrode layers 131a and 132a, the electrode layers 131a and 132a may be sintered electrodes including a conductive metal and a glass, or resin-based electrodes including a conductive metal and a resin.

In addition, the electrode layers 131a and 132a may have a form in which a sintered electrode and a resin-based electrode are sequentially formed on a body. In addition, the electrode layers 131a and 132a may be formed by transferring a sheet, including a conductive metal, onto a body, or may be formed by transferring a sheet, including a conductive metal, onto a sintered electrode.

As the conductive metal included in the electrode layers 131a and 132a, a material having improved electrical conductivity may be used and is not limited. For example, the conductive metal may be at least one of nickel (Ni), copper (Cu), and alloys thereof.

As a further detailed example of the plating layers 131b and 132b, each of the plating layers 131b and 132b may be a nickel (Ni) plating layer or a tin (Sn) plating layer. Alternatively, a NI plating layer and a Sn plating layer may be sequentially formed on the electrode layers 131a and 132a, or a Sn plating layer, a Ni plating layer, and an Sn plating layer may be sequentially formed on the electrode layers 131a and 132a. In addition, the plating layers 131b and 132b may include a plurality of Ni plating layers and/or a plurality of Sn plating layers.

A size of the multilayer electronic component does not need to be limited.

However, in order to achieve both miniaturization and high capacitance, the dielectric layer and the internal electrode should be thinned to increase the number of laminated layers. Therefore, the reliability and withstand voltage characteristics of the present disclosure may be significantly improved in a multilayer electronic component having a size of 0402 (0.4 mm×0.2 mm) or less.

Accordingly, when a distance between the third and fourth surfaces of the body is defined as L and a distance between the fifth and sixth surface is defined as W, L may be 0.4 mm or less and W may be 0.2 mm or less. For example, the multilayer electronic component may have a size of 0402 (0.4 mm×0.2 mm) or less.

Embodiment

Table 1 shows evaluations of chip strength, humidity resistance, and withstand voltage characteristics depending on change in dielectric filling ratio.

The internal electrode connectivity and the dielectric filling ratio were measured in a 60 µm×40 µm region of a central portion of the body after scanning an image of a cross section in first and third directions (a W-T cross section) in a center of the body in the second direction with a scanning electron microscope (SEM).

Chip strength was measured as compressive fracture strength using a universal testing machine (UTM). In the case in which the test number 7 had chip strength of 100%, relative strengths were measured and listed in Table 1.

Humidity resistance reliability was measured by checking the number of samples, having an insulating resistance value lowered to 1/10 or less as compared to an initial value the initial value, among 400 samples, when a reference voltage of 2Vr was applied for 12 hours at a temperature of 85° C. and relative humidity of 85%. The checked number of samples was listed in Table 1.

Withstand voltage characteristics were measured by applying a voltage to a chip at boosting speed of 20V/sec to measure a breakdown voltage (BDV) at which leakage current was 20 mA or more. In Table 1, NG refers to a case in which BDV was 40V or less.

TABLE 1

| Test No. | Internal Electrode Connectivity (%) | Dielectric Filling Ratio (%) | Thickness of Internal Electrode (μm) | Thickness of Dielectric Layer (μm) | Chip Strength (%) | Humidity resistance Reliability | Withstand Voltage Characteristics |
|---|---|---|---|---|---|---|---|
| 1* | 80 | 20 | 450 | 463 | 60 | 4/400 | OK |
| 2 | 81 | 30 | 450 | 458 | 80 | 0/400 | OK |
| 3 | 85 | 40 | 450 | 474 | 85 | 0/400 | OK |
| 4 | 87 | 50 | 450 | 451 | 89 | 0/400 | OK |
| 5 | 89 | 60 | 450 | 453 | 94 | 0/400 | OK |
| 6 | 86 | 70 | 450 | 466 | 98 | 0/400 | OK |
| 7* | 84 | 80 | 450 | 450 | 100 | 0/400 | NG |
| 8* | 80 | 90 | 450 | 461 | 102 | 1/400 | NG |

In the case of Test No. 1, a dielectric filling ratio was 20%, and chip strength and humidity resistance reliability were deteriorated.

In the case of Test No. 7, a dielectric filling ratio was 80% and chip strength, and humidity resistance was improved while breakdown voltage characteristics were deteriorated.

Meanwhile, in the case of the test Nos. 2 to 6 having a dielectric filling ratio of more than 20% to less than 80%, chip strength, humidity resistance reliability, and withstand voltage characteristics were all improved.

In the case of the test Nos. 2 to 6, a result of analyzing an image scanned by a scanning electron microscope (SEM) was that at least one disconnected portion of an internal electrode included both a pore and a dielectric substance disposed to connect adjacent dielectric layers to each other and has a length greater than a thickness of the internal electrode.

As described above, according to an exemplary embodiment of the present disclosure, reliability of a multilayer electronic component may be improved.

While exemplary embodiments of the present disclosure have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers and internal electrodes alternately disposed in a first direction; and
external electrodes disposed on the body,
wherein at least one internal electrode of the internal electrodes includes a plurality of disconnected portions penetrating through a respective internal electrode,
a disconnected portion of the plurality of disconnected portions includes at least one of a pore or a dielectric substance disposed to connect adjacent dielectric layers to each other,
at least one of the plurality of disconnected portions includes both the pore and the dielectric substance and has a length greater than a thickness of the at least one internal electrode on a cross section of the body taken in the first direction,
the internal electrodes and the dielectric substance include at least one of silicon (Si), magnesium (Mg), or aluminum (Al), and
at least one disconnected portion of the plurality of disconnected portions includes a dielectric substance which is not connected to dielectric layers adjacent to the at least one disconnected portion.

2. The multilayer electronic component of claim 1, wherein the body has first and second surfaces disposed to oppose each other in the first direction, third and fourth surfaces connected to the first and second surfaces and disposed to oppose each other in a second direction, and fifth and sixth surfaces connected to the first to fourth surfaces and disposed to oppose each other in a third direction, and
the cross section of the body taken in the first direction refers to a cross section in the second and first directions or a cross section in third and first directions.

3. The multilayer electronic component of claim 1, wherein a dielectric filling ratio, defined as a ratio of an overall length of the dielectric substance to an overall length of the disconnected portion on a cross section of the body taken in the first direction, is more than 20% to less than 80%.

4. The multilayer electronic component of claim 1, wherein an internal electrode connectivity, defined as a ratio of a length of the at least one internal electrode excluding the disconnected portion to a length of the at least one internal electrode on a cross section of the body taken in the first direction, is 70% or more.

5. The multilayer electronic component of claim 1, wherein each of the dielectric layers has a thickness of 0.41 μm or less.

6. The multilayer electronic component of claim 1, wherein each of the internal electrodes has a thickness of 0.41 μm or less.

7. The multilayer electronic component of claim 1, wherein at least one of the plurality of disconnected portions is composed of the dielectric substance.

8. The multilayer electronic component of claim 1, wherein the body has first and second surfaces disposed to oppose each other in the first direction, third and fourth surfaces connected to the first and second surfaces and disposed to oppose each other in a second direction, and fifth and sixth surfaces connected to the first to fourth surfaces and disposed to oppose each other in a third direction, and
L is 0.4 mm or less and W is 0.2 mm or less, where a distance between the third and fourth surfaces of the body is denoted as "L" and a distance between the fifth and sixth surface is denoted as "W".

9. The multilayer electronic component of claim 1, wherein each of the internal electrodes has a thickness of 0.41 μm or less and each of the dielectric layers has a thickness of 0.41 μm or less.

10. A multilayer electronic component comprising:
a body including dielectric layers and internal electrodes alternately disposed in a first direction; and
external electrodes disposed on the body,
wherein at least one internal electrode of the internal electrodes includes a plurality of disconnected portions penetrating through a respective internal electrode,
a disconnected portion of the plurality of disconnected portions includes at least one of a pore or a dielectric substance disposed to connect adjacent dielectric layers to each other,
at least one of the plurality of disconnected portions includes both the pore and the dielectric substance and has a length greater than a thickness of the at least one internal electrode on a cross section of the body taken in the first direction,
the internal electrodes and the dielectric substance include at least one of silicon (Si), magnesium (Mg), or aluminum (Al), and
a dielectric filling ratio, defined as a ratio of an overall length of the dielectric substance to an overall length of the disconnected portion on a cross section of the body taken in the first direction, is more than 20% to less than 80%.

11. The multilayer electronic component of claim 10, wherein the body has first and second surfaces disposed to oppose each other in the first direction, third and fourth surfaces connected to the first and second surfaces and disposed to oppose each other in a second direction, and fifth and sixth surfaces connected to the first to fourth surfaces and disposed to oppose each other in a third direction, and
the cross section of the body taken in the first direction refers to a cross section in the second and first directions or a cross section in third and first directions.

12. The multilayer electronic component of claim 10, wherein an internal electrode connectivity, defined as a ratio of a length of the at least one internal electrode excluding the disconnected portion to a length of the at least one internal electrode on a cross section of the body taken in the first direction, is 70% or more.

13. The multilayer electronic component of claim 10, wherein each of the dielectric layers has a thickness of 0.41 μm or less.

14. The multilayer electronic component of claim 10, wherein each of the internal electrodes has a thickness of 0.41 μm or less.

15. The multilayer electronic component of claim 10, wherein at least one of the plurality of disconnected portions is composed of the dielectric substance.

16. The multilayer electronic component of claim 10, wherein the body has first and second surfaces disposed to oppose each other in the first direction, third and fourth surfaces connected to the first and second surfaces and disposed to oppose each other in a second direction, and fifth and sixth surfaces connected to the first to fourth surfaces and disposed to oppose each other in a third direction, and
L is 0.4 mm or less and W is 0.2 mm or less, where a distance between the third and fourth surfaces of the body is denoted as "L" and a distance between the fifth and sixth surface is denoted as "W".

17. The multilayer electronic component of claim 10, wherein each of the internal electrodes has a thickness of 0.41 μm or less and each of the dielectric layers has a thickness of 0.41 μm or less.

* * * * *